Figure 1:
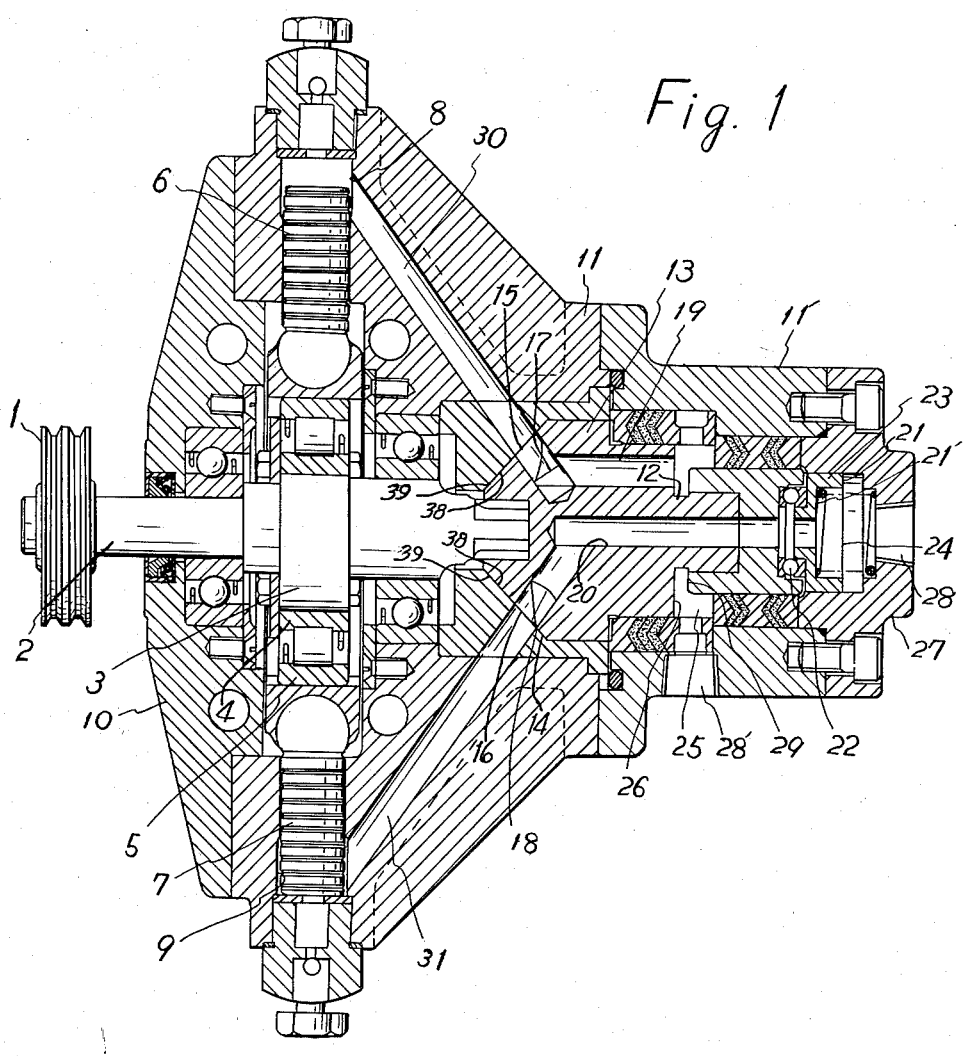

Feb. 7, 1961   TEIZO KOHTAKI   2,970,578
OIL PRESSURE MOTOR

Filed May 21, 1958   2 Sheets-Sheet 1

INVENTOR.
TEIZO KOHTAKI
BY
Leon M. Strauss
AGT.

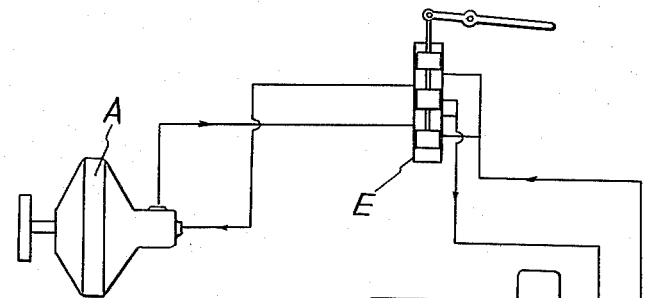
Fig. 3
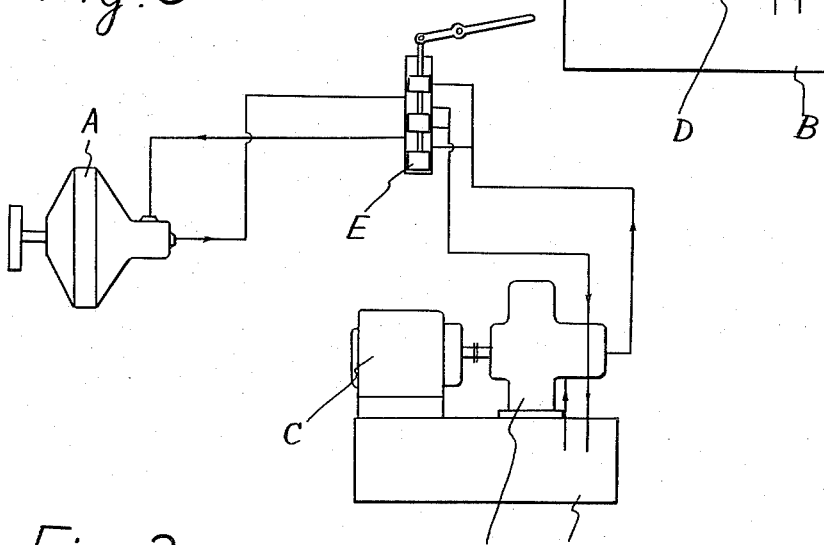
Fig. 2
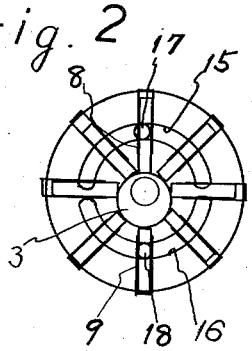
INVENTOR.
TEIZO KOHTAKI

United States Patent Office 2,970,578
Patented Feb. 7, 1961

2,970,578
OIL PRESSURE MOTOR

Teizo Kohtaki, 3028—2 Shimokanuki Ushibuse, Numazu, Japan

Filed May 21, 1958, Ser. No. 736,822

Claims priority, application Japan June 24, 1957

2 Claims. (Cl. 121—121)

This invention relates to an oil pressure motor having a power source such as a rotary pump of a constant rotating direction driven by a prime mover and a change-over mechanism, for example, a change-over valve interposed between the oil pressure motor and the rotary pump, by means of which mechanism the oil pressure motor can be rotated in two opposite directions.

More particularly, the invention relates to an oil pressure motor comprising in combination a motor assembly including a rotating shaft, an eccentric wheel keyed to said shaft, a plurality of plungers so arranged radially of said shaft as to be able to reciprocate rectilinearly to drive said eccentric wheel, a housing having therein cylinder bores for receiving slidably therein said plungers, respectvely, a rotary valve assembly including a rotary valve body adapted to rotate synchronously with said rotating shaft and provided with at least a conical slide face, and a valve chest for said valve body which has therein two separate oil passages capable of communicating with said cylinder bores.

The main object of this invention is to obtain an oil pressure motor of the above-mentioned type which can be reversed in direction rapidly and smoothly and which is substantially leakproof.

In order to attain this object, according to this invention, the two separate oil passages in the rotary valve body communicate with two separate oil chambers, respectively, which provide for the valve body two faces of almost equal area which are subject to oil pressures acting to press the valve body against its seat during operation of the oil pressure motor.

The accompanying drawing shows one embodiment of the oil pressure motor of this invention, wherein Fig. 1 is a longitudinal sectional view of the embodiment, Fig. 2 is a skeleton sketch showing the relation between the valve passages and the cylinder bores of the motor, and Fig. 3 shows diagrammatical views of an oil pressure motor arrangement, wherein the motor can rotate in two opposite d.rections, respectively.

Referring to Fig. 1, there is shown a rotating shaft 2 having a pulley 1 keyed thereto. Also keyed to the shaft 2 is an eccentric wheel 3 embraced by a race 4. Onto this race 4 an eccentric strap 5 is mounted loosely through a plurality of rollers, thus forming a roller bearing together with the race 4. A plurality of plungers 6, 7 which are fastened to the strap 5 are arranged radially of the shaft 2.

A stationary housing 10 having therein cylinder bores 8, 9 into which are inserted slidably said plungers 6, 7 respectively, which can reciprocate rectilinearly to drive said eccentric wheel 3 extends on one side to form a part 11 of the valve chest, into which is inserted rotatably a rotary valve body 13 splined to the shaft 2. This valve body has a conical slide face indicated at 38 and having a vertical angle of approximately 90° as in Fig. 1 abutting conical valve seat 39 of valve seat member or bushing 14 forming part or an extension of housing 10 at its end confronting the shaft 2 and a stem 12. This valve body has therein two separate oil passages 19 and 20 having ports 17, 18, respectively, opening into two arcuate circumferential grooves 15, 16, each extending in the conical face over approximately 180° i.e., semicircularly and symmetrically to the axis of the valve body. The oil passage 20 is situated centrally in the valve body, while the oil passage 19 is positioned eccentrically in the valve body. The oil passage 20 opens into an oil chamber 24 formed between an end piece 23 carrying a ball bearing 22 and an end cover 27 fixed by screws to the other part 11' of the valve chest. Thus, the valve body 13 is provided with a first pressure face which has an area equal to the total area of the two end faces 21 and 21' of the end piece 23. On the other hand, the oil passage 19 opens into an oil chamber 25 adjacent the stem 12, which chamber provides for the valve body a second pressure face of an area almost equal to that of the first pressure face (21, 21') and equal to the difference between the area of the end face 26 minus the cross sectional area of the passage 19 and that of one end face 29 of a connecting piece fixed to the stem 12 and carrying the ball bearing 22. The areas of these two pressure faces can be determined experimentally or from operating conditions of the oil pressure motor. 28 and 28' denote oil inlet and outlet openings, while 30 and 31 denote oil conduits in the housing 10 to connect the grooves 15 and 16 with the cylinders 8 and 9.

When a pressure oil is fed from an oil pump (D in Fig. 3) into the passage 20 through the opening 28, said oil flows through the chamber 24, the passage 20, the groove 16 and the conduit 31 into the cylinders 9, whereby the plungers 7 are pressed against the eccentric wheel 3 to drive the shaft 2 with the pulley 1. As synchronously with the shaft 2 the valve body 13 is rotated the groove 15 will communicate with the cylinders 9, whereby the oil will be discharged through the passage 19, the chamber 25 and the opening 28'.

In Fig. 3 which shows diagrammatically a practical arrangement using an oil pressure motor, A is an oil pressure motor, B an oil tank, C an electric motor, D an oil pump driven by said electric motor and E a change-over piston valve. By operating the piston valve suitably oil flows either in one direction or the other direction, as shown in Fig. 3 by arrows, resulting in rotation of the motor A in one or the other direction.

Because, as mentioned above, the valve body of the oil pressure motor of this invention is provided with the first and second pressure faces of almost equal area which are exposed to oil pressure during operation of the motor, the valve body is pressed always automatically with its conical face against the valve seat, irrespective of rotating directions of the motor, whereby a great oil tightness of the motor, especially, in the valve assembly, is kept without any special additional packing means.

From the foregoing it will be seen that many modifications of the specific disclosed form of the invention may be resorted to, and it is to be understood that the scope of the invention is to be ascertained solely by the appended claims.

I claim:

1. An oil pressure motor comprising a housing having a plurality of cylinder bores therein, a shaft rotatably mounted in said housing, an eccentric wheel in said housing keyed to said shaft, a plurality of plungers arranged radially of said shaft in said bores drivingly connected to said eccentric wheel for rotation of said shaft, a rotary valve assembly including a valve body rotatably mounted in said housing rotating synchronously with said shaft and having a first oil passage axially located in said body and a second oil passage eccentrically disposed in said body, said valve body being splined to said shaft, conduits in said housing connected to said cylinders and for connecting said cylinders to said passages, said housing being provided with a conical valve seat, said valve body having a conical slide face engaging said conical valve seat for closing said conduits, said valve body having a stem, a connecting piece fixed to said stem and defining with said valve body and said housing a first oil chamber, said valve body having a surface defining said first oil chamber forming a first face against which oil under pressure supplied to said first oil chamber exerts a force acting to press said conical slide face of said valve body against said housing, an end piece rotatably mounted on said connecting piece, and an end cover fixed to said housing and spaced from said end piece to define therebetween a second oil chamber, said end piece having a surface forming a second face against which oil under pressure supplied to said second oil chamber exerts a force on said end piece transmitted through said connecting piece to said valve body acting to press said conical slide face against said housing.

2. The oil pressure motor of claim 1, wherein said first face and said second face are of substantially equal surface area.

References Cited in the file of this patent

UNITED STATES PATENTS

| | | |
|---|---|---|
| 1,520,960 | Nagelmann | Dec. 30, 1924 |
| 1,924,423 | Svenson | Aug. 29, 1933 |
| 1,937,077 | West | Nov. 28, 1933 |
| 2,081,760 | Nardone | May 25, 1937 |
| 2,304,903 | Eppens | Dec. 15, 1942 |
| 2,839,033 | Kersey et al. | June 17, 1958 |

FOREIGN PATENTS

| | | |
|---|---|---|
| 218,061 | Great Britain | July 3, 1924 |